(No Model.) 3 Sheets—Sheet 1.
R. K. BOYLE.
TELEGRAPH.
No. 318,345. Patented May 19, 1885.
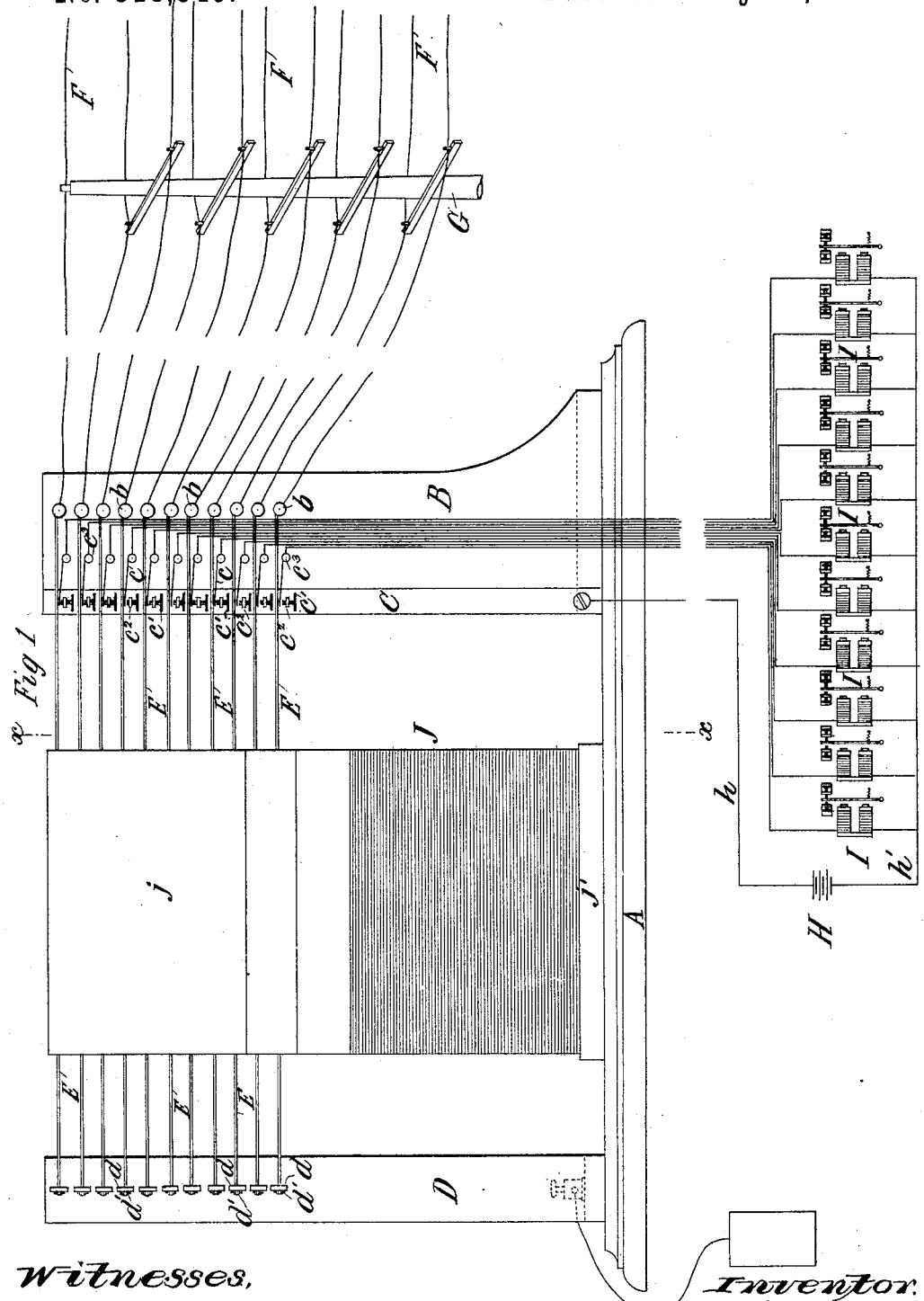
Witnesses,
Jo. L. Coombs
Robert Everett
Inventor.
Robert K. Boyle,
By James L. Norris.
Atty.

(No Model.) 3 Sheets—Sheet 2.
R. K. BOYLE.
TELEGRAPH.
No. 318,345. Patented May 19, 1885.
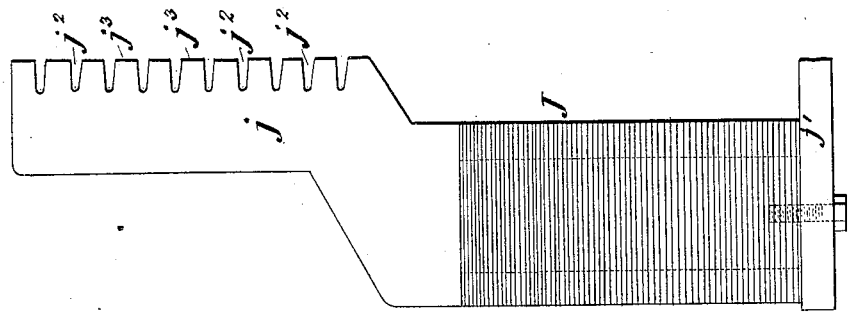
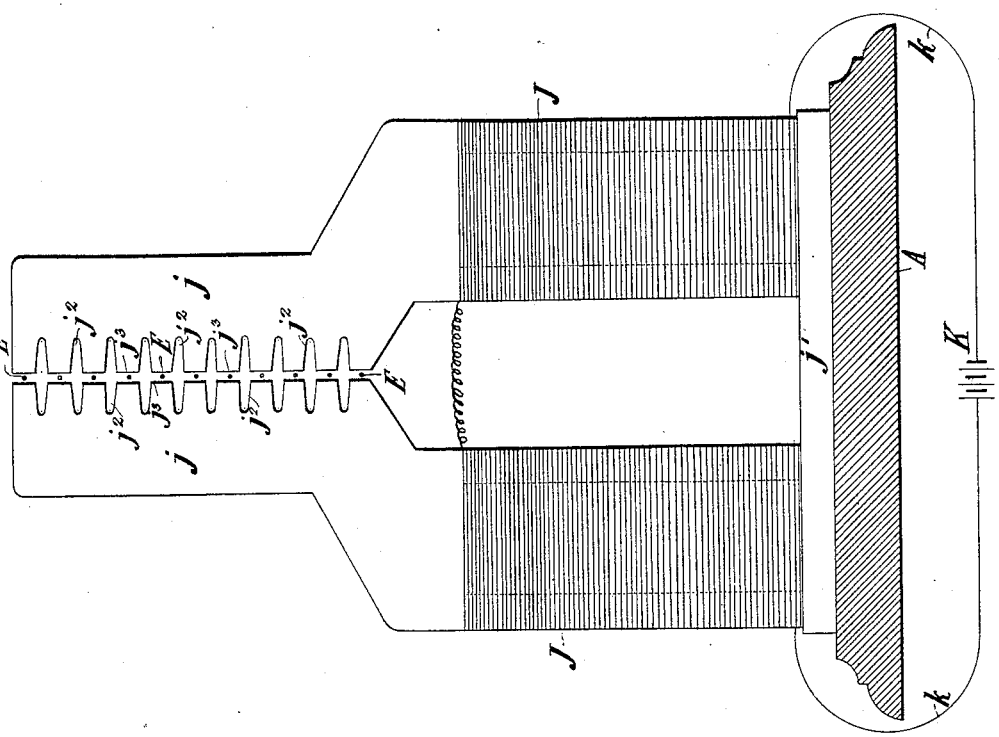
Witnesses,
Jo. L. Coombs
Robert Everett
Inventor
Robert K. Boyle.
By James L. Norris,
Atty.

(No Model.) 3 Sheets—Sheet 3.
R. K. BOYLE.
TELEGRAPH.
No. 318,345. Patented May 19, 1885.
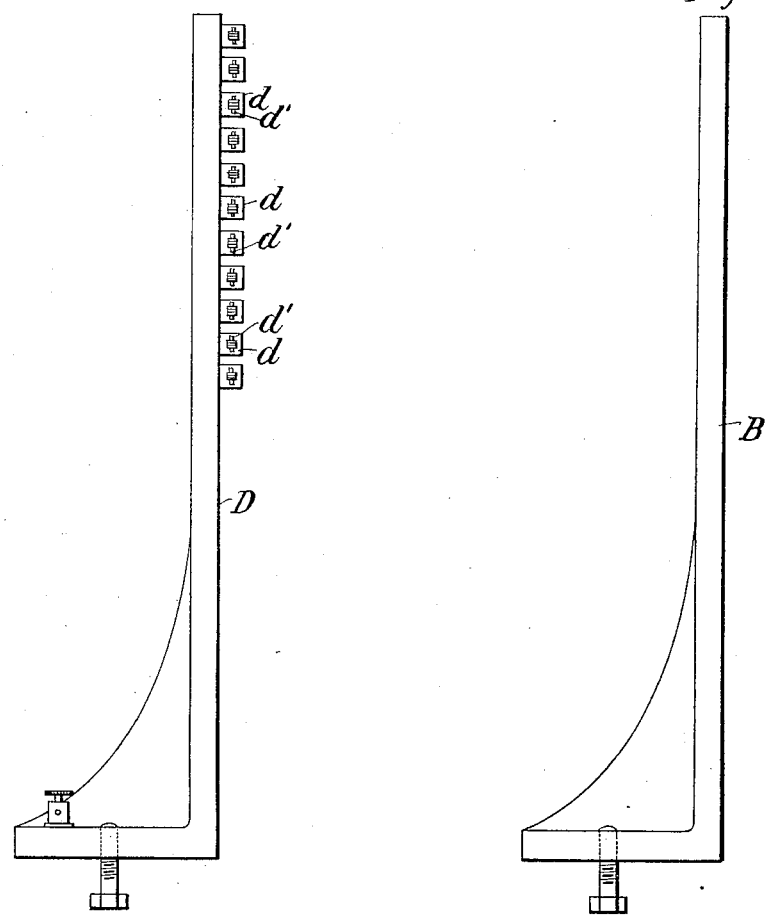
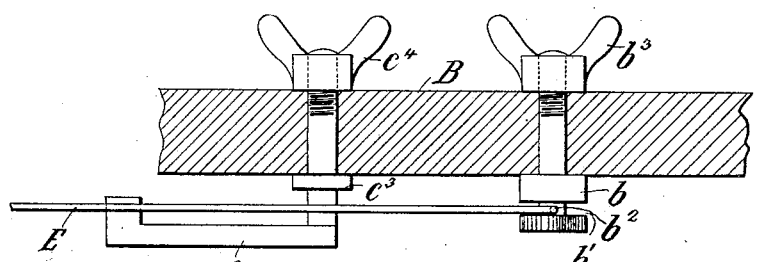
Witnesses,
Jo. L. Coombs
Robt Everett
Inventor,
Robert K. Boyle,
By James L. Norris,
Atty.

UNITED STATES PATENT OFFICE.

ROBERT KIRK BOYLE, OF LIVERPOOL, ENGLAND.

TELEGRAPH.

SPECIFICATION forming part of Letters Patent No. 318,345, dated May 19, 1885.

Application filed June 21, 1884. (No model.) Patented in England May 7, 1884, No. 7,375.

*To all whom it may concern:*

Be it known that I, ROBERT KIRK BOYLE, electrician, a subject of the Queen of Great Britain, residing at Liverpool, England, have invented a new and useful Method of and Apparatus for Facilitating the Use of Electric Currents for Telegraphic Purposes, (for which I have applied for provisional protection in Great Britain on the 7th day of May, 1884, No. 7,375,) of which the following is a specification, reference being had to the accompanying drawings.

My invention relates to an improved method of and apparatus for facilitating the use of electric currents for telegraphic operations, and is designed to provide means whereby very considerable advantages may be obtained in respect to such operations as compared with the means heretofore employed for effecting the same purposes.

My improved apparatus or instrument is constructed upon a distinct and novel principle, whereby the following advantages (among others) are obtained—that is to say:

First. An instrument made according to my invention causes such a very inconsiderable resistance in the circuit that a large number of instruments may be arranged in combination with one line-wire without adding very perceptibly to the amount of resistance existing in the line itself. It will be apparent that this is a considerable practical advantage under all circumstances, and more especially in the case of long lines in which there are many stations.

Secondly. The use of my invention enables me to dispense entirely with the costly relay-instruments heretofore employed, as it will fulfill all the purposes of a relay in a very simple manner.

Thirdly. By my invention the readjustment necessary in instruments as heretofore used, by reason of atmospheric or other causes, is rendered unnecessary, as my instruments remain entirely unaffected by such causes, and are at all times in condition to operate efficiently.

Fourthly. The speed of transmission is increased as compared with methods and instruments heretofore used.

Fifthly. One apparatus will serve for use with from one to twenty or more line-wires.

My said invention comprises the employment of a direct electrical conductor passing through a magnetic field in such a manner that when a current from a line-wire passes through the conductor the said conductor will close a local circuit, in which are included a battery and a receiving-instrument, and when such current ceases to pass the said conductor will open the said circuit. By these means the said receiving-instrument can be operated by means of the said local battery by an operator at a distant station.

My said invention also comprises improved apparatus for effecting this result.

In the accompanying drawings I have shown how my said invention may be conveniently and advantageously carried into practice.

Figure 1 represents a side elevation of apparatus made according to my said invention, and also a diagram of its connections with the line-wires and with the receiving-instruments. Fig. 2 is a section on the line $x\,x$, Fig. 1. Fig. 3 is an end elevation of part of an electro-magnet made according to my invention. Figs. 4 to 6 show various details of the said apparatus.

Like letters indicate the same parts throughout the drawings.

A is the base of the apparatus, which may be of wood or other suitable material.

B is a standard or support, of wood, ebonite, or other suitable non-conducting or insulating material, which is fixed to the base A, and to which is secured a metal strip, C.

D is another standard or support, also fixed to the base A, and made of metal, except when required for use at a way-station—that is to say, a station where there is no earth-connection—in which case this standard or support must be of wood or other insulating material, or the wires hereinafter described must be insulated therefrom.

E E are thin steel or other wires, stretched between the support B and the support D. These wires may be secured to the support D by passing their ends through holes in the lugs or projections $d$ and winding them around short steel bars $d'$. The said wires are secured to the support B in such a manner that their tension can be regulated. For this purpose I insert in the support B screws $b$, Fig. 6, having milled heads, and each formed with a groove, $b'$, and a perforation, $b^2$. The wire is passed through this perforation, and the screw $b$ is then turned until the wire has the required tension. The screw $b$ is then rigidly secured in the support B by means of the nut $b^3$. The wires E are equal in number to the line-wires F, which are used in connection with the apparatus, and each line-wire F is connected with one of the wires E through the screws $b$ in the insulating standard or support B.

G represents an ordinary telegraph-post, carrying the line-wires. The metallic support D is connected to earth in the arrangement shown in the drawings; but in the case of a way-station the wires E would be insulated from the support and so arranged that they would conduct the electric current to the next station.

Upon the insulating-support B, I provide as many contact-springs $c$ and adjustable screws $c'$ as there are wires E, and each of the screws $c'$ is inserted in a lug or projection, $c^2$, in such a manner that it can be adjusted nearer to or farther from the corresponding spring, $c$. One of the wires E passes immediately above each of the springs $c$, but is normally out of contact therewith. The springs $c$ are made adjustable in the following manner—that is to say, each of these springs is fixed at one end to a stud, $c^3$, Fig. 6, having a screw-threaded extension, which is passed through the support B and secured by a nut, $c^4$. To adjust the spring $c$ the nut $c^4$ is slackened and the said spring moved nearer to or farther from the corresponding wire, E, and the said nut is then again tightened. The screws $c'$ are electrically connected to the metal strip C, which is connected to one pole of a local battery, H, by a wire, $h$. The other pole of the said battery is connected by a wire, $h'$, through one of the sounders I or other receiving-instruments to each of the springs $c$.

J is an electro-magnet, fixed to the base A in any convenient position between the supports B and D. Between the limbs or polar extensions $j$ of this magnet the stretched wires E pass at a sufficient distance apart to keep them from contact with each other. This magnet is constructed as follows—that is to say, the two cores, around which the wire is coiled in the usual manner, are united by a metal plate or piece, $j'$, fixed thereto by means of screws or otherwise. Above the coiled portion the metal of each limb is bent inward for a short distance, and then upward, as shown, to form the two polar extensions $j$, between which the stretched wires pass. A convenient width for this magnet is eighteen inches; but this may be varied according to circumstances.

Along the entire width of the internal face of each of the limbs or polar extensions $j$, I form a series of deep grooves or corrugations, $j^2$, which may be V-shaped or of other suitable form, and between each two grooves or corrugations the metal is left with a flat (or other suitably-shaped) face, $j^3$, forming a projection considered with respect to the bases of the grooves. The two limbs or polar extensions stand opposite and are in close proximity to each other, and the grooves in one limb are opposite to those in the other limb, the surfaces between the grooves being also opposite to each other in the same manner. Each of the wires E passes between the said limbs or polar extensions in such a position that it lies parallel with and between the flat or other shaped surfaces or projections thereof. The ends of the wire $k$, wound on this magnet, are connected with the poles of a local battery, K, and are kept so continuously during the time the apparatus may be required to work—that is to say, the magnet is kept continuously excited, and there is at all times, when the apparatus is likely to be required, a powerful magnetic field between the said limbs or polar extensions. When a current is sent through either of the line-wires F, it traverses the corresponding wire, E, and the result is, that this latter wire is, by the joint action of the magnet and of the line-current, depressed, so as to act upon the spring $c$ and cause the same to come into contact with the screw $c'$ below the said wire.

If desired, the apparatus may be so constructed that the upward movement of the wire or its movement in any other direction will cause the said contact. This action at once brings the local battery H, for working the sounders or other receiving-instruments, into circuit, and the particular instrument in connection with this wire is operated. As soon as the line-current ceases to pass, the wire E is released and resumes its original position, so that it is out of contact with the corresponding spring, and the local circuit is broken. Thus the required impulses may be sent for giving the necessary sounds, or for operating a pen or otherwise, the wire being moved up and down or vibrated at the will of the operator at the sending-station.

It is obvious that by establishing the suitable connections this apparatus may also fulfill the functions of a relay for any purpose in any well-known manner. It is also obvious that it may be used for working various kinds of indicating apparatus—such, for instance, as the ordinary sounders or apparatus in which a pen or the like is employed, or even for apparatus in which the principle of utilizing musical notes is adopted.

The apparatus above described is an efficient one, and the best known to me for utilizing the principle upon which my invention is based; but it will be obvious that the said apparatus may be varied in construction without departing from the essential features of the said invention, as above set forth. For example, I may, if desired, use other electrical conductors instead of the wires E, which conductors are arranged in any suitable manner to permit their movement either upward, downward, or in any other suitable direction by the joint action of the magnet and the current passing through them from the line-wire.

The construction of the magnet may, moreover, be varied in many ways and still be made to serve the purpose of my invention.

In some cases, instead of arranging the circuits in which the sounders or receiving-instruments are located in the manner above described, I connect each of the said instruments to an arm or piece carrying a contact-stud, with which the stretched wire or other conductor is adapted to make contact, and which is attached to the aforesaid wooden support. The said instrument is also connected to one pole of a local battery, the other pole of which is connected with the aforesaid metallic support, and thus with the ends of all the wires attached to this support.

I am aware of the existence of a telegraph apparatus in which a gold or silver leaf deflected by a current of electricity passing through it when placed in a magnetic field has been employed to complete a secondary circuit in order to work a recording or other instrument or relay.

I am also aware that it is not new to employ as a means for giving telegraphic signals an electro-magnet through which the line-wire passes, and which is suspended between the poles of permanent or electro magnets included in a secondary circuit. Such devices form no part of my invention, since they do not involve the use of a grooved or corrugated magnet between the poles or polar extensions of which the line-wires pass, whereby not only is the power of the magnetic field increased, but equalized throughout its entire extent between the polar extensions.

What I claim is—

1. In a telegraph apparatus, the combination of a magnet having polar extensions corrugated or grooved on their opposing faces, a series of line-wires stretched between the polar extensions, a secondary or local circuit, and one or more circuit-controllers therefor controlled by the stretched wires, substantially as described.

2. In a telegraph apparatus, the combination of a magnet having polar extensions corrugated or grooved on their opposing faces, a series of line-wires or continuations of line-wires stretched in the magnetic field between the polar extensions, and a secondary or local circuit containing receiving or recording apparatus, substantially as described.

In testimony whereof I have hereunto signed my name in the presence of two subscribing witnesses.

ROBERT KIRK BOYLE.

Witnesses:
   J. WATT,
   JOHN DEAN,
      *Both of* 17 *Gracechurch Street, London.*